United States Patent
Nasser et al.

(10) Patent No.: US 11,681,064 B2
(45) Date of Patent: Jun. 20, 2023

(54) LOOK-AHEAD VSP WORKFLOW THAT USES A TIME AND DEPTH VARIANT Q TO REDUCE UNCERTAINTIES IN DEPTH ESTIMATION AHEAD OF A DRILLING BIT

(71) Applicant: Saudi Arabian Oil Company, Dhahran (SA)

(72) Inventors: Husain Salman Nasser, Safwa (SA); Manuel Jose Vega Lara, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 475 days.

(21) Appl. No.: 16/596,205

(22) Filed: Oct. 8, 2019

(65) Prior Publication Data
US 2021/0103068 A1    Apr. 8, 2021

(51) Int. Cl.
*G01V 1/42* (2006.01)
*G01V 1/30* (2006.01)
*G01V 1/50* (2006.01)

(52) U.S. Cl.
CPC ............... *G01V 1/42* (2013.01); *G01V 1/303* (2013.01); *G01V 1/50* (2013.01); *G01V 2210/161* (2013.01); *G01V 2210/614* (2013.01); *G01V 2210/6226* (2013.01); *G01V 2210/63* (2013.01)

(58) Field of Classification Search
CPC . G01V 1/303; G01V 1/42; G01V 1/48; G01V 1/50; G01V 2210/161; G01V 2210/614; G01V 2210/6226; G01V 2210/63
See application file for complete search history.

(56) References Cited

U.S. PATENT DOCUMENTS

| | | | |
|---|---|---|---|
| 6,807,489 B2 | 10/2004 | Naville et al. | |
| 2002/0091487 A1* | 7/2002 | Moerig | G01V 1/005 702/2 |
| 2011/0267921 A1 | 11/2011 | Mortel et al. | |
| 2016/0177707 A1* | 6/2016 | Hsu | E21B 47/10 702/12 |

(Continued)

FOREIGN PATENT DOCUMENTS

CN    108919354    11/2018

OTHER PUBLICATIONS

GCC Examination Report in GCC Appln. No. GC 2020-40591, dated Aug. 25, 2021, 4 pages.

(Continued)

*Primary Examiner* — Regis J Betsch
(74) *Attorney, Agent, or Firm* — Fish & Richardson P.C.

(57) ABSTRACT

Disclosed are methods, systems, and computer-readable medium to perform operations including: receiving seismic data acquired by at least one receiver of a geologic survey system configured to perform a geologic survey of a subterranean formation, wherein the seismic data is associated with reflected acoustic signals generated by at least one source of the geologic survey system; calculating a ground force signal by stacking the acoustic signals generated by the least one source; calculating, using the ground force signal, a time and depth variant quality factor (Q) of the subterranean formation; and compensating, based on the time and depth variant Q, attenuation in the seismic data.

17 Claims, 8 Drawing Sheets

(56) References Cited

U.S. PATENT DOCUMENTS

2019/0049612 A1  2/2019  Padhi et al.

OTHER PUBLICATIONS

Zhang, "Seismic absorption estimation and compensation," PHD Thesis for Doctor of Philosophy, University of British Columbia, Vancouver, Nov. 2008, 109 pages.
Zhang et al., "Compensation for absorption and dispersion in prestack migration: an effective Q approach," Geophysics, Jan. 2013, 78(1):S1-S14.
PCT International Search Report and Written Opinion in International Appln. No. PCT/US2020/054780, dated Feb. 9, 2021, 16 pages.

* cited by examiner

LOOK-AHEAD VSP WORKFLOW THAT USES A TIME AND DEPTH VARIANT Q TO REDUCE UNCERTAINTIES IN DEPTH ESTIMATION AHEAD OF A DRILLING BIT

TECHNICAL FIELD

This disclosure relates to a look-ahead vertical seismic profile (VSP) workflow.

BACKGROUND

Vertical seismic profile (VSP) is a technique that is used to conduct geophysical surveys of a subterranean formation. A VSP system includes a source disposed at or near a surface of the formation and receivers arranged within a wellbore located in the formation. The VSP system acquires VSP data by detecting, at the receivers, reflected seismic waves that originated from the source. Some applications of VSP data include obtaining high-resolution seismic images (that is, images with higher resolution than images obtained using standard seismic surveys) and looking ahead of a drilling bit when drilling a wellbore. Specifically, to look ahead of the drilling bit, the VSP data is used to estimate formation characteristics (for example, velocity and depth) ahead of the drilling bit.

However, seismic waves that originate from the source experience energy loss when propagating through the formation, perhaps due to fluid movement and friction with grain boundaries. A parameter called quality factor (Q) quantifies the attenuation (in amplitude and frequency) of the propagating wavelet. Q is defined as the ratio of the peak energy of a seismic wave to the energy dissipated after propagating through the formation. When processing VSP data, it is desirable to compensate for the attenuation of seismic waves. Doing so helps provide higher resolution seismic images and better qualitative amplitude versus offset (AVO) analysis than otherwise achievable.

SUMMARY

The present disclosure describes a method for calculating a quality factor (Q) of a subterranean formation based on vertical seismic profile (VSP) data. The disclosed method of calculating Q can be implemented in any VSP workflow, such as the look-ahead VSP workflow described in this disclosure.

Aspects of the subject matter described in this specification may be embodied in methods that include the actions of: receiving seismic data acquired by at least one receiver of a geologic survey system configured to perform a geologic survey of a subterranean formation, wherein the seismic data is associated with reflected acoustic signals generated by at least one source of the geologic survey system; calculating a ground force signal by stacking the acoustic signals generated by the least one source; calculating, using the ground force signal, a time and depth variant quality factor (Q) of the subterranean formation; and compensating, based on the time and depth variant Q, attenuation in the seismic data.

The previously described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium. These and other embodiments may each optionally include one or more of the following features.

In a first aspect, where the geologic survey system is a vertical seismic profile (VSP) system, and where the seismic data is VSP data.

In a second aspect, where the at least one receiver includes a plurality of receivers, and where calculating, using the ground force signal, the time and depth variant quality factor (Q) of the subterranean formation includes calculating a respective Q for a plurality of intervals in the subterranean formation, where the plurality of intervals are defined by a respective depth of the plurality of receivers within the subterranean formation.

In a third aspect, where calculating, using the ground force signal, the time and depth variant quality factor (Q) of the subterranean formation includes using a spectral ratio method to calculate the time and depth variant quality factor.

In a fourth aspect, generating, based on data from nearby wells, an initial Earth model.

In a fifth aspect, creating, based on the seismic data, a corridor stack; inverting the corridor stack to create an acoustic impedance profile of the subterranean formation; using an empirical relationship to derive a density from the initial Earth model; fitting (i) measured density from well-bore logging data and (ii) the derived density from the initial Earth model; and using the acoustic impedance profile and the fitted density to calculate a velocity profile ahead of a drilling bit that is drilling a wellbore in the subterranean formation.

In a sixth aspect, generating, using the velocity profile ahead of the drilling bit, a depth profile ahead of the drilling bit.

In a seventh aspect, using a spectral ratio method to estimate a Q of the ground force signal; and determining, based on the Q of the ground force signal, whether losses in the seismic data are due to geology of the subterranean formation.

In an eighth aspect, calculating a standard deviation of the ground force signal; and determining, based on the standard deviation of the ground force signal, whether losses in the seismic data are due to geology of the subterranean formation.

Particular implementations of the subject matter described in this disclosure can be implemented to realize one or more of the following advantages. First, the disclosed workflow improves the amplitude and phase attenuation compensation prior to inversion of the seismic data, thereby improving the accuracy of the inversion. Second, the disclosed workflow improves a turnaround time of look-ahead VSP. The improved turnaround time is achieved by using iterative inversion on the VSP corridor stack to estimate formation characteristics (for example, velocity and depth) ahead of the drilling bit. Other advantages will be apparent to those of ordinary skill in the art.

The details of one or more implementations of the subject matter of this disclosure are set forth in the description, the claims, and the accompanying drawings. Other features, aspects, and advantages of the subject matter will become apparent from the description, the claims, and the accompanying drawings.

BRIEF DESCRIPTION OF THE DRAWINGS

Like reference numbers and designations in the various drawings indicate like elements.

DETAILED DESCRIPTION

The following detailed description describes systems and methods for a look-ahead vertical seismic profile workflow. The description is presented to enable a person skilled in the art to make and use the disclosed subject matter in the context of one or more particular implementations. Various modifications, alterations, and permutations of the disclosed implementations can be made and will be readily apparent to those skilled in the art. Furthermore, the general principles defined may be applied to other implementations and applications without departing from the scope of the disclosure. Thus, the present disclosure is not intended to be limited to the described or illustrated implementations. Rather, the present disclosure is to be accorded the widest scope consistent with the principles and features disclosed.

As explained previously, attenuation of seismic signals traveling through a subterranean formation is quantified by a quality factor (Q). Specifically, the attenuation of seismic signals in a formation is inversely related to the Q of the formation. Determining the attenuation of seismic signals (for example, anelastic attenuation) is important for improving seismic resolution (among other reasons). In practice, one of the methods for calculating Q is the spectral ratio method. This method calculates Q of an interval by estimating an effective attenuation between two seismic waveforms, one from the top of the interval and one from the bottom. Specifically, the spectral ratio method defines the relationship between the two seismic waveforms in Equation (1) as:

$$\frac{A}{A'} = G*R*e^{\frac{-\pi*f*t}{Q}} \quad (1)$$

In Equation (1), A is an amplitude of a seismic waveform after traversing the formation (that is, the seismic waveform from the bottom of the interval) and A' is an amplitude of a seismic waveform before traversing the formation (that is, the seismic waveform from the top of the interval). The seismic waveform from the top of the interval is also referred to as a reference trace. G is a geometrical spreading factor (that compensates for the way that the seismic waves propagate as half spheres into the formation), R is a reflection coefficient, f is a frequency of the seismic waveforms in hertz (Hz), t is the time needed for the wavelet to traverse the interval, and Q is the quality factor.

Generally, most of the signal attenuation occurs in a near surface of the formation and in unconsolidated layers. As such, when calculating Q using the spectral ratio method, it is desirable to use one of the traces from the near surface as the reference trace. However, in VSP systems, shallow VSP data (for example, <1,000 feet from the surface of the formation) is noisy and cannot be used as the reference trace. This noise is due to the presence of multiple casing strings in the shallow levels, which distorts the VSP data reflected from those levels.

The present disclosure describes a method for calculating a quality factor (Q) that accounts for seismic signal attenuation in the near surface and in the unconsolidated layers of a formation. In an implementation, a ground force is used as the reference trace to calculate Q when using the spectral ratio method. The ground force is a measurement of the sweep at or near the surface where the seismic waves have not traveled through the formation. At every sweep or shot, the ground force is recorded. In some implementations, the recordings of the ground force are stacked to produce a stacked ground force. Then, the stacked ground force is used as the reference trace. The disclosed method of calculating Q can be implemented in any VSP workflow, such as the look-ahead VSP workflow described in this disclosure.

Figure 1:
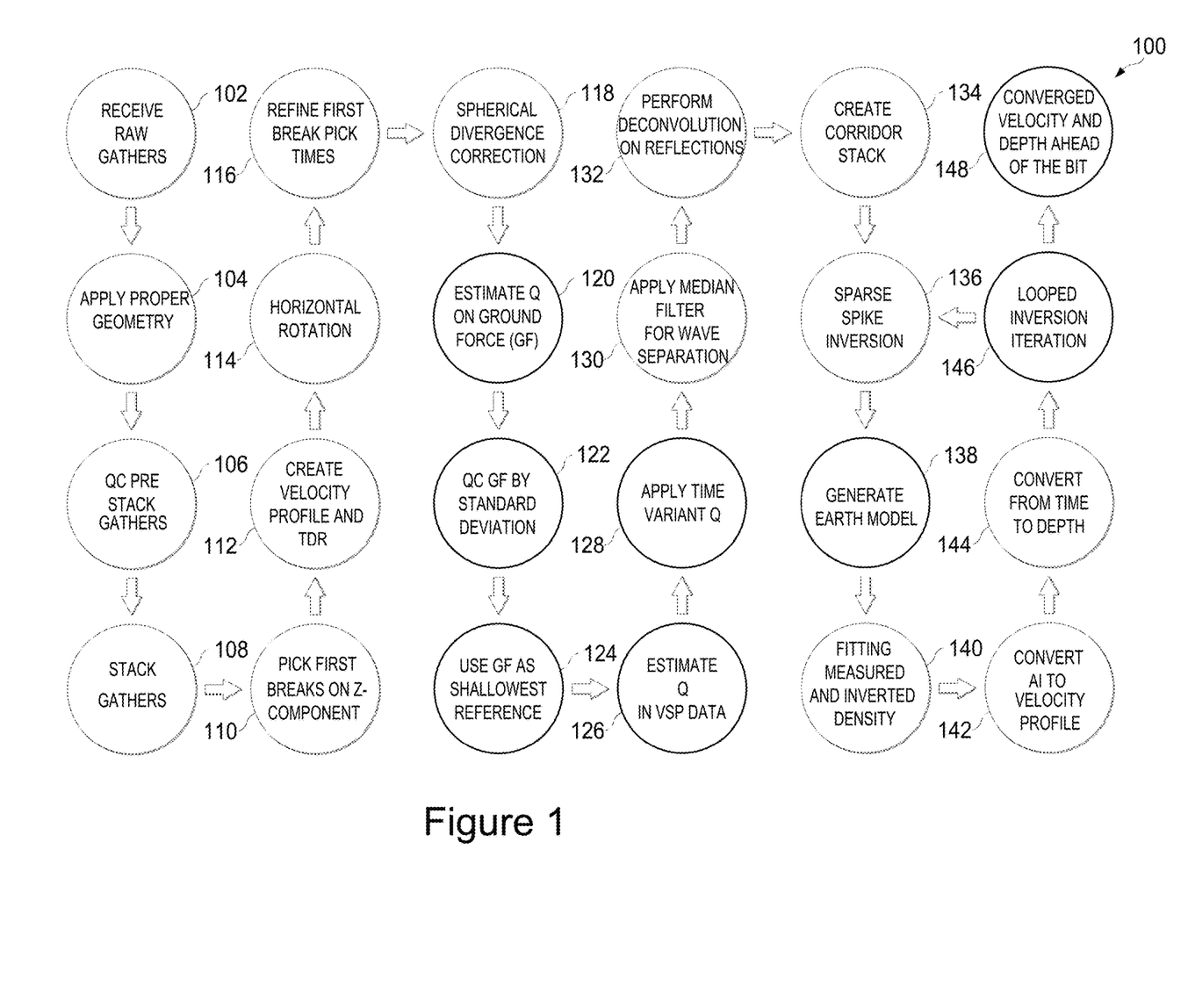
FIG. 1 illustrates a look-ahead vertical seismic profile workflow, according to some implementations of the present disclosure.

FIG. 1 illustrates a look-ahead vertical seismic profile (VSP) workflow 100, according to some implementations. In an embodiment, the workflow 100 can be used to look ahead of a drilling bit when drilling a wellbore in a subterranean formation. Specifically, the workflow 100 can be used to predict characteristics (for example, depth and velocity) of the formation that lies ahead of the drilling bit. In an example, the look-ahead results can be interpreted by a seismic interpreter to assess the formation ahead of the drilling bit. Looking ahead of the drilling bit helps prevent drilling risks by reducing uncertainties in a geological model representing the formation. Additionally, a drilling system can use the predictions of the workflow 100 to autonomously adjust a drilling plan. For example, the drilling system can use the predictions as a basis to control one or more drilling tools (for example, a drilling bit) in real-time.

For clarity of presentation, the description that follows generally describes the workflow 100 in the context of the other figures in this description. As an example, the workflow 100 can be performed by a computer system described in FIG. 7. However, it will be understood that the workflow 100 may be performed, for example, by any suitable system, environment, software, and hardware, or a combination of systems, environments, software, and hardware, as appropriate. In some implementations, various steps of the workflow 100 can be run in parallel, in combination, in loops, or in any order.

The workflow 100 starts at step 102, which involves receiving raw (that is, unprocessed) prestack gathers acquired in a subterranean formation. The prestack gathers may be received from a well survey system, such as the well survey system 600 illustrated in FIG. 6. In an implementation, the well survey system is a VSP system, such as a zero-offset vertical seismic profile system. As described below, the VSP system may include three-component receivers. In such a system, the prestack gathers are three-component VSP data gathers that include a vertical component and two horizontal components. In the example of onshore VSP data acquisition, the VSP seismic source is a truck with a sweeping plate on the bottom of the truck. This truck, called Vibroseis, couples its plate to the ground (for example, presses the plate to ground) and sweeps to create a motion (for example, a vibration) that is transmitted through the subsurface and recorded by the receivers arranged within the borehole.

At step 104, the workflow 100 involves applying proper geometry to the prestack gathers. The proper geometry includes proper well location (for example, x and y coordinates of the well location), proper well geometry, proper shot location (for example, x and y coordinates of the shot locations), proper ground elevation at the shot location, and proper receiver offset. The proper well geometry indicates deviation of the well in measured depth, inclination, and azimuth, perhaps from the normal angle of an ideal vertical well.

At step 106, the workflow 100 involves passing the prestack gathers through a first pass quality check (QC). This QC, which is performed in the prestack domain, involves checking the prestack gathers for bad traces. Bad traces can be defined based on different parameters or characteristics. For example, a bad trace can be defined as a trace that has signal-to-noise ratio (SNR) less than a predetermined threshold (for example, an SNR threshold of 1). Bad traces can be caused by coupling issues, background noise, tool failure, heat inside the well, among other issues. This QC also involves deleting bad traces that are detected in the prestack gathers. The first pass QC (for example, detecting and deleting bad traces in the prestack gathers) can be performed manually, automatically, or both manually and automatically.

At step 108, the workflow 100 involves stacking the gathers that have passed through the first pass QC.

At step 110, the workflow 100 involves picking first-breaks on the vertical component of the VSP data. Specifically, first-break picking on the vertical component involves picking onset arrivals of the seismic traces in the vertical component. First-break picking on the vertical component can be performed manually, automatically, or both manually and automatically. In an implementation, the picked first-breaks are used to create a time-to-depth profile for the formation. The time-to-depth profile is also referred to as a time-to-depth relationship (TDR).

At step 112, the workflow 100 involves using the time-to-depth profile to create a velocity profile for the formation. Specifically, Equation (2) is used to create the velocity profile based on the time-to-depth profile and a respective depth of each receiver of the survey system. Equation (2) defines the relationship between depth and velocity as:

$$\text{depth} = \text{time} * \text{velocity}. \quad (2)$$

At step 114, the workflow 100 involves transferring the first-breaks from the vertical component to the horizontal components of the VSP data. This transfer facilitates performing horizontal rotation, which maximizes energy in one horizontal component (referred to as the radial component). Horizontal rotation is a mathematical operation that takes the eigenvalues of both horizontal components and maximizes the energy in the radial component. Because the eigenvalues are transferred to the radial component, the energy is minimized in the other horizontal component (referred to as the transverse component). If the first-break picks are accurate, the first-breaks will have the same arrival time on the radial component and on the vertical component. Therefore, the first-breaks having different arrival times on the radial and vertical components indicates that the VSP data was either not processed correctly or that the picked times are incorrect (for example, due to noise masking the first arrivals on the vertical component). As such, comparing the first-break radial arrival time and first-break vertical arrival time can serve as a second pass QC that evaluates the picking accuracy.

At step 116, the workflow 100 involves refining the first-break pick times. In an embodiment, refining the first-break pick times involves determining whether the picks are inaccurate or whether picking is not possible. For example, if the picks are inaccurate, then the picks can be remedied by picking them on the radial component. And, if picking is not possible, then the trace is deleted and first-breaks are not picked at that location. Picking at a location is not possible in scenarios where all three components of the VSP data are noisy at that location, perhaps due to tube-waves or casing ringing.

At step 118, the workflow 100 involves applying spherical divergence correction to the VSP data.

At step 120, the workflow 100 involves estimating a quality factor, Q, of a ground force. The ground force measures the energy coming out of the source before it propagates through the subsurface. The Q of the ground force can be calculated using the spectral ratio method. Specifically, the Q can be calculated using two different VSP data traces (that is, each data trace is from a respective triggering of the VSP seismic source), where the amplitude spectrum of one trace is A and the amplitude spectrum of the other trace is A'. If the conditions of the ground against which the Vibroseis is pressing its plate remain the same, then A'=A, which results in a Q that tends to infinity. Conversely, if there are changes in the surface conditions (for example, the ground condition changing or the source plate not being properly coupled to the ground), then A' A, which results in a low Q (for example, a Q that does not tend to infinity or has values less than 100). This indicates that the losses are due to surface conditions. As such, estimating the Q of the ground force can be used to ensure that the losses in the seismic data are due to geology and not due to changes in surface conditions. In particular, a low Q is indicative of losses that are not due to geology (for example, due to changes in the surface conditions or due to the source energy being inconsistent).

At step 122, the workflow 100 involves using standard deviation to perform a QC on the ground force. Like step 120, performing a QC on the ground force by standard deviation is used to ensure that the losses are due to geology and not due to changes in the surface conditions. More specifically, the standard deviation of seismic traces may be calculated. A high standard deviation may indicate that the losses are due to surface conditions. Whereas, a lower standard deviation may indicate that the losses are due to geology. Standard deviation is the square root of sample variance, where sample variance is defined by Equation (3) as:

$$S^2 = \frac{\Sigma(X_i - X')^2}{N - 1}. \quad (3)$$

In Equation (3), $S^2$ is sample variance, S is standard deviation, $X_i$ is a value in a dataset, X' is a sample mean, and N is the number of samples.

At step 124, the workflow 100 involves designating a ground force measurement as a reference trace for purposes of calculating Q using the spectral ratio method. The ground force provides signal energy before the seismic signals undergo any attenuation. Thus, the ground force guarantees that true maximum energy of the reference trace is used in the spectral ratio method, thereby improving the accuracy of the Q estimate. In an implementation, the stacked ground force is used as the reference trace.

At step 126, the workflow 100 involves estimating Q in the VSP data. In an implementation, a respective Q is estimated for each of one or more intervals in the formation. The one or more intervals in the formation may be defined by the location of the receivers in the formation. In the example where receivers are vertically displaced in the formation, an interval spans a depth between any two receivers (or a top surface of the formation and a depth of the first receiver in the case of a first interval). Because a respective Q is calculated for each interval, the Q is time and depth variant. Furthermore, because the wavefield data has not yet been separated, the Q is estimated from total wavefield data.

In an embodiment, the spectral ratio method is used to estimate the respective Q for each of the one or more intervals in the formation. In an implementation, when calculating a respective Q using the spectral ratio method, the ground force is used as the reference trace (that is, $A'$ in Equation (1)). The other trace (that is, $A$ in Equation (1)) is a trace that is reflected from the interval for which the Q is being estimated. For example, to use the spectral ratio method to estimate the Q for the first interval, the ground force is used as the reference trace, and a trace from the first interval is used as the other trace. Using the ground force as the reference trace accounts for attenuations that occur in the near surface of the formation and in the unconsolidated layers. In an implementation, the ground force is a stacked ground force that is used as the reference trace.

At step 128, the workflow 100 involves compensating, based on the time and depth variant Q, the amplitude and frequency attenuation in the VSP data. In an implementation, the attenuation is calculated as the reciprocal of Q. Then, based on the calculated attenuation, the attenuated amplitudes and frequencies are compensated. The amplitude and frequency attenuation may result from friction with formation grains and fluids trapped in the formation (that is, anelastic attenuation).

At step 130, the workflow 100 involves applying a median filter for wave separation. More specifically, the median filter is applied to the VSP data in order to separate positive-slowness downgoing wavefields and negative-slowness upgoing wavefields. Doing so prevents the downgoing and upgoing wavefields from interfering with one another. In some implementations, before the median filter is applied to the VSP data, first-arrival time shifts are applied to the data in order to flatten the downgoing wavefields. Other methods of wavefield separation include mean filtering and extracting upgoing wavefields.

At step 132, the workflow 100 involves performing deconvolution on the separated upgoing wavefields. In an implementation, the deconvolution operators are generated based on the downgoing or the upgoing wavefields. The deconvolution of the upgoing wavefields removes the source signature and downgoing multiples from the traces.

At step 134, the workflow 100 involves creating a corridor stack. In an implementation, the corridor stack is created by stacking the deconvoluted upgoing wavefields.

At step 136, the workflow 100 involves inverting the corridor stack. Inverting the corridor stack (that is, poststack inversion) involves transforming the corridor stack into quantitative rock physics parameters. For example, the corridor stack can be inverted into an acoustic impedance profile of the formation. In an implementation, the corridor stack is inverted using sparse spike inversion.

At step 138, the workflow 100 involves generating an initial Earth model based on data from nearby wells. The data from nearby wells may include well logs, identified well markers and formations, and horizons coming from seismic interpretation that are used to connect one well with another and interpolate in between. The data from the nearby wells may be used, for example, to generate a density profile of the formation. Empirical relationships between rock physics parameters can then be used to update the Earth model. Gardner's relationship is an example empirical relationship that is used to estimate densities from velocities and vice versa. Other example empirical relationships are possible.

At step 140, the workflow 100 involves fitting (i) a measured density in the drilled section from logs and (ii) the density that was derived using Gardner's relationship in step 138.

At step 142, the workflow 100 involves converting the acoustic impedance profile to a velocity profile. Specifically, the formation density (calculated in step 140) and the acoustic impedance profile (calculated in step 136) are used to calculate the velocity profile using the relationship:

$$\text{Acoustic Impedance}=\text{velocity}*\text{density}. \quad (5)$$

At step 144, the workflow 100 involves calculating a depth ahead of the drilling bit. More specifically, once the velocity profile is determined for the formation (for example, ahead of the drilling bit), the estimated depth of the formation may be determined using Equation (2). That is, the time information (from the seismic data) and the velocity profile (calculated in step 142) are used to determine the depth in a section of the formation ahead of the drilling bit.

At step 146, the workflow 100 involves performing a looped inversion iteration. As previously described, the workflow 100 implements an iterative inversion to solve for the Earth model. The goal of the iterative inversion is for the data to converge to a minimum misfit or error. Since the velocities and densities ahead of the drilling bit are unknown, the iterative inversion starts with an initial model of density ahead of the drilling bit and uses the initial model of density to estimate a velocity profile ahead of the drilling bit. Then, the iterative inversion calculates the misfit between the forward modeling results (that is, results from the initial model) and the inverted results. If the misfit is greater than a predetermined threshold, the iterative inversion performs another iteration of inversion after updating the initial model with the results from the first inversion iteration. The iterative inversion continues to perform iterations of the inversion until the misfit is less than or equal to the predetermined threshold.

As such, at step 146, the workflow 100 involves determining whether the iteration has converged to a solution. If not, then the workflow 100 updates the Earth model with the results from the current iteration. Then, the workflow 100 returns to step 136 to perform the next iterative inversion. This process is repeated until the iteration converges to a solution. The iterative inversion does not force one trend of either logs or seismic velocity but tries to solve for the Earth's model.

Figure 2A:
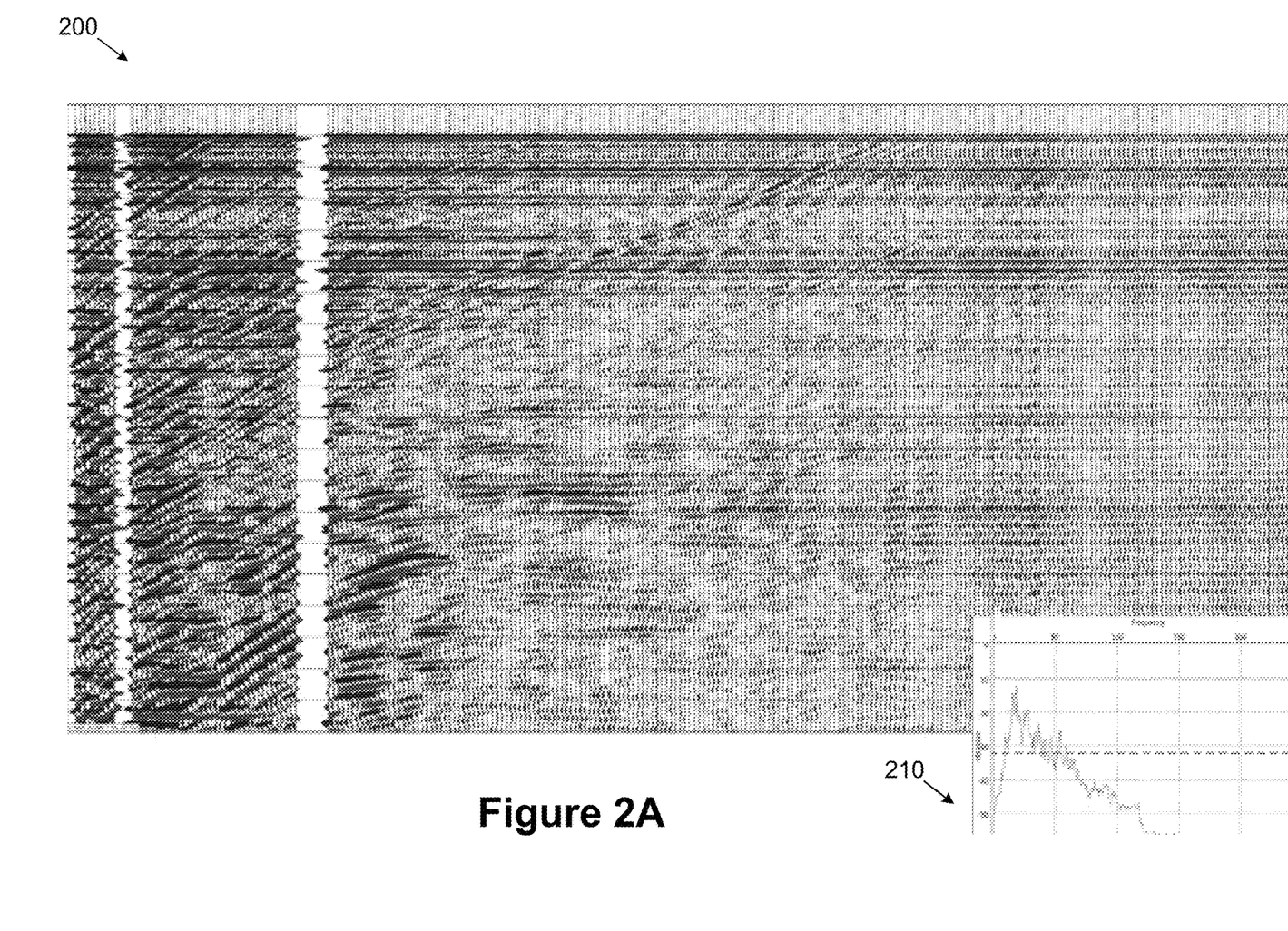
FIGS. 2A and 2B illustrate total wavefield vertical seismic profile data compensated based on a time-variant quality factor, according to some implementations of the present disclosure.
Figure 2B:
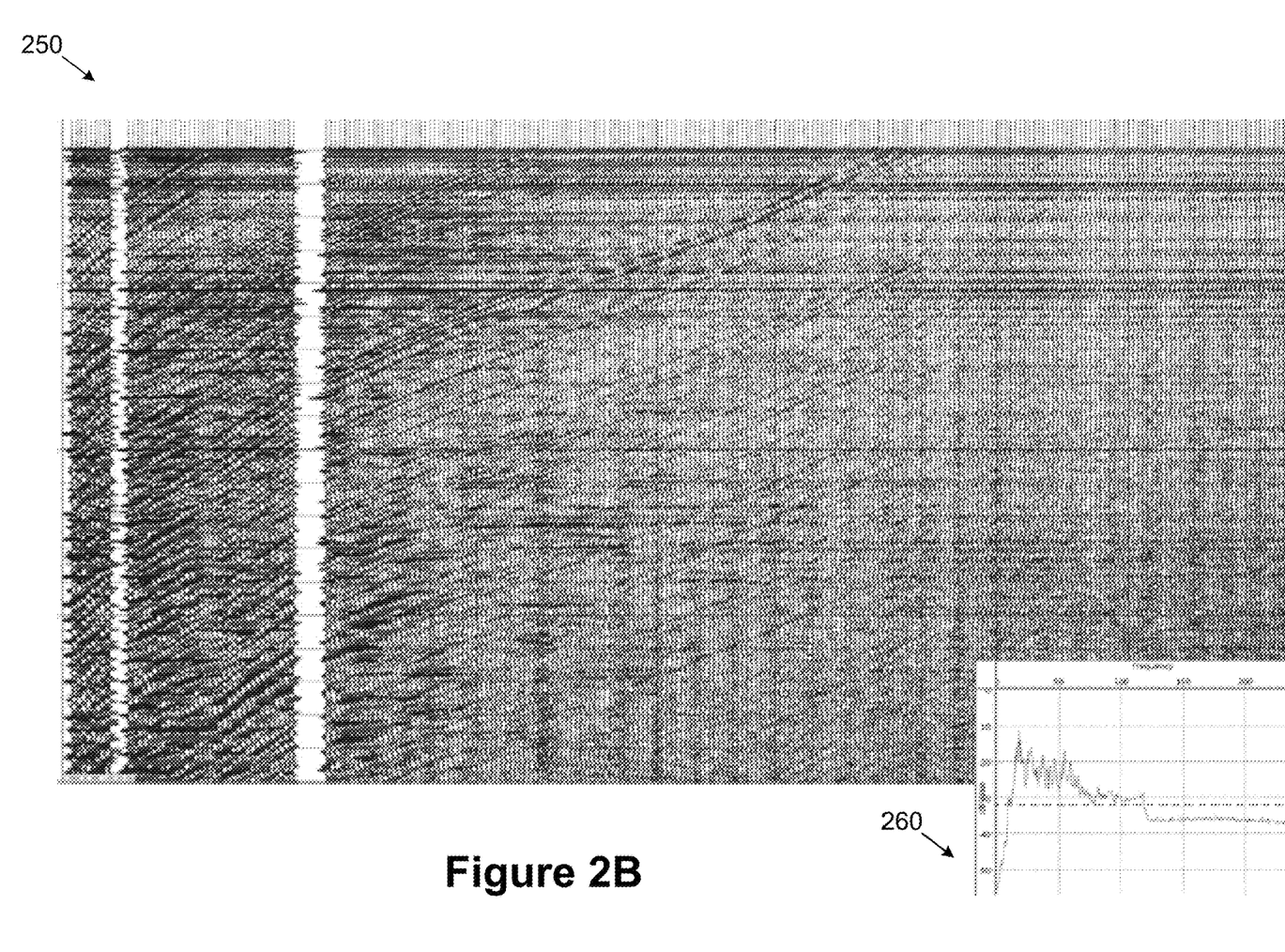

FIGS. 2A and 2B illustrate the effect of compensating for time-variant Q on total wavefield VSP data, according to some implementations. In particular, FIG. 2A illustrates total wavefield data prior to compensating for the time-variant Q, and FIG. 2B illustrates total wavefield data after compensating for the time-variant Q. As shown in graph 200, the data for the total wavefield before compensating for Q has only frequencies up to 60 Hz above the −30 decibel (dB) threshold. On the other hand, as shown in graph 250, the frequency bandwidth from 2-120 Hz is above the −30 dB threshold. Furthermore, comparing the graphs 200 and 250 visually illustrates that the amplitudes of the data were sharpened after compensating for Q. Furthermore, comparing subgraph 210 and 260 illustrates the improvements of amplitudes vs. frequency. Note that the total wavefield data in both FIGS. 2A and 2B has been corrected for spherical divergence.

Figure 3:
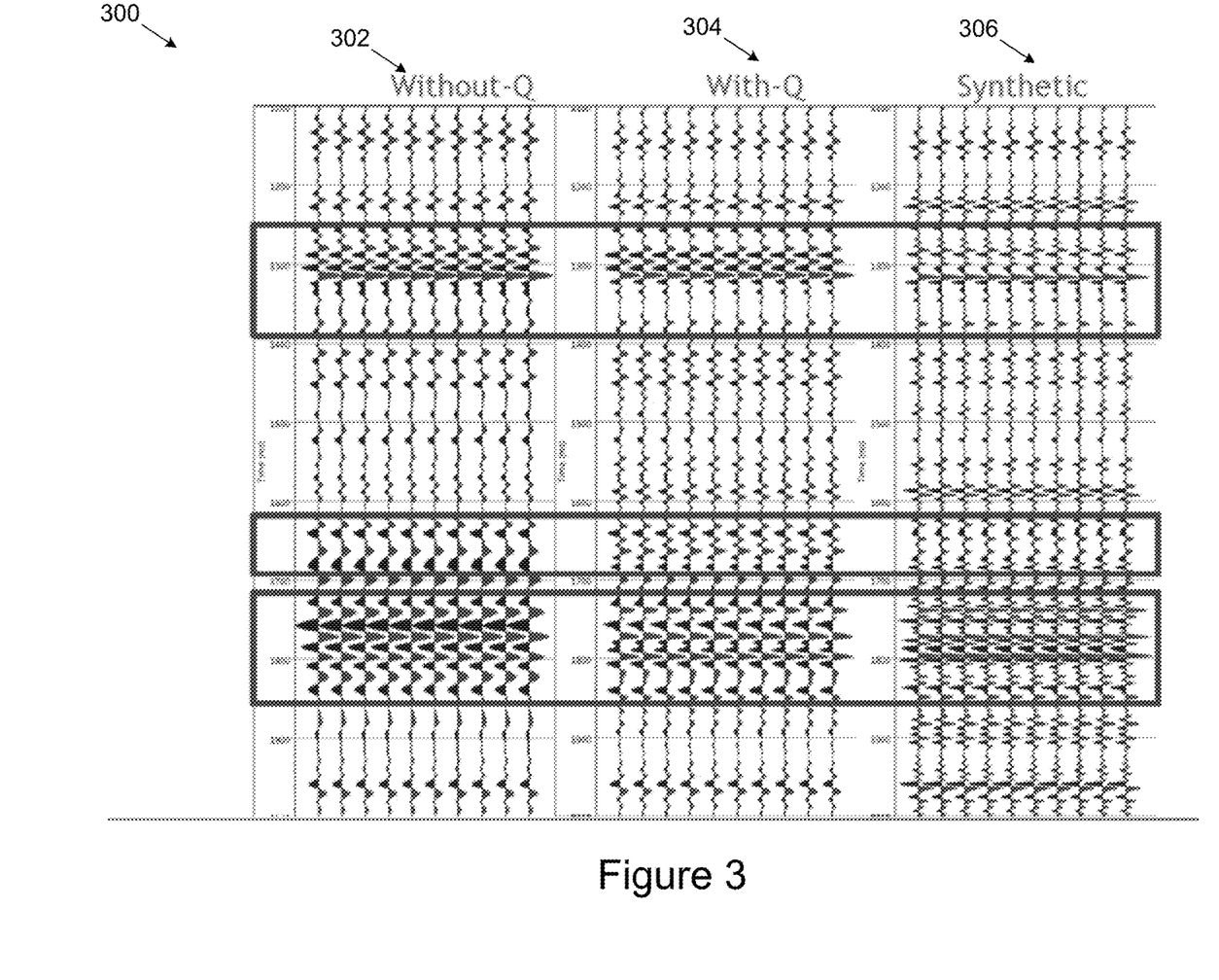
FIG. 3 illustrates a comparison of corridor stack frequency before and after applying a time-variant quality factor to the corridor stack, according to some implementations of the present disclosure.

FIG. 3 illustrates a comparison 300 of a corridor stack frequency before and after applying a quality factor to the corridor stack, according to some implementations. Specifically, FIG. 3 compares the corridor stack created from upgoing wavefield with deconvolution applied before Q and after Q compensation synthetics. Plot 302 illustrates a corridor stack without compensating for Q. Plot 304 illustrates a corridor stack with Q compensation. Plot 306 illustrates a response of how synthetic data should look like using well logs. When comparing the three plots in FIG. 3, the highlighted regions in the rectangles show the effect of Q compensation. As shown by comparing the plots, Q compensation improved the data, made the events sharper, and made the events closer in shape to the synthetic data.

Figure 4:
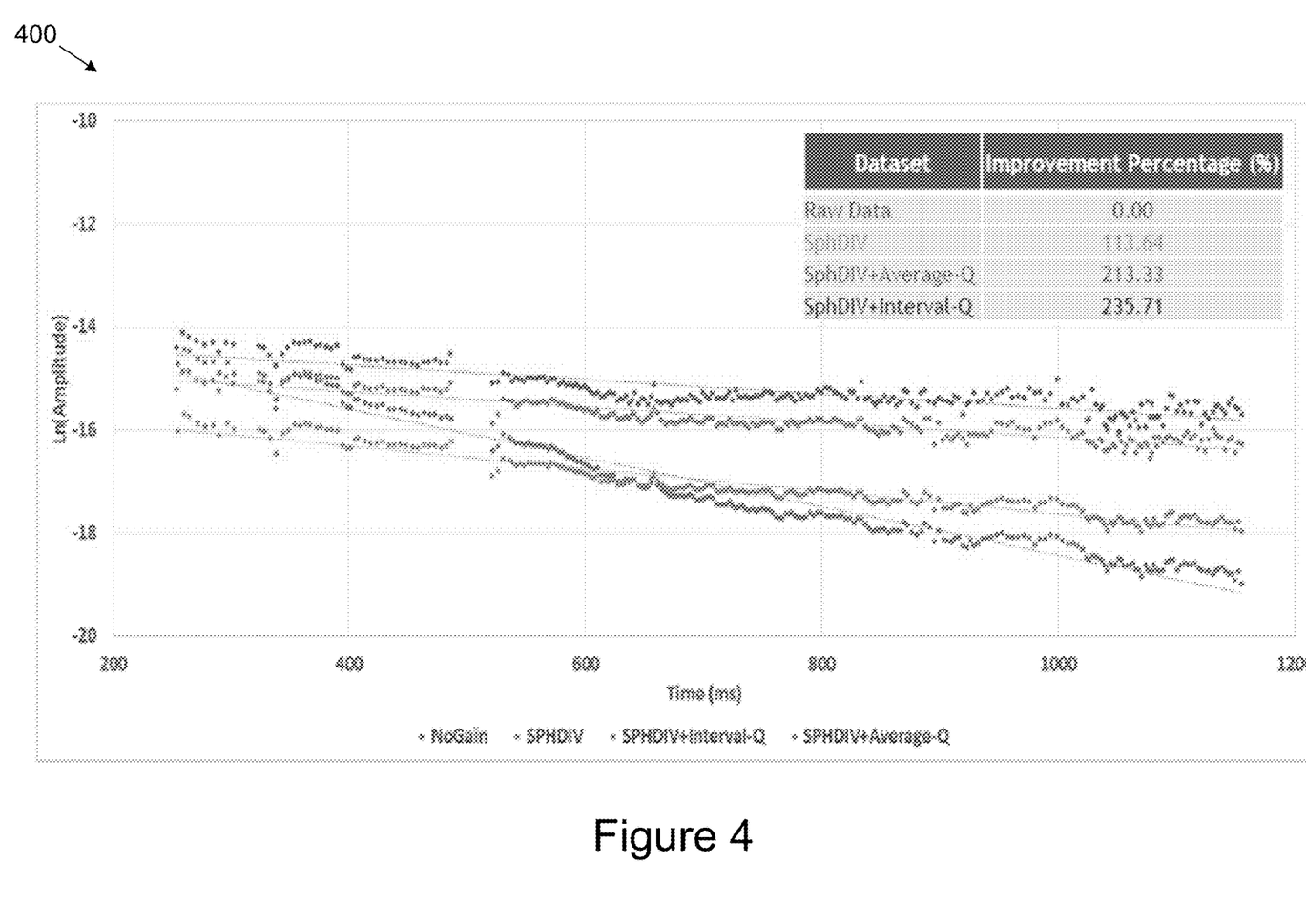
FIG. 4 illustrates a comparison of different seismic data correction methods, according to some implementations of the present disclosure.

FIG. 4 illustrates a comparison of results from different types of seismic data corrections, according to some implementations. Graph 400 depicts the results from (i) raw data, (ii) spherical divergence corrections, (iii) spherical divergence corrections and average Q compensation, and (iv) spherical divergence corrections and interval Q compensation. In graph 400, the flatter the curve of the results, the better the correction. As shown in FIG. 4, the correction of spherical divergence corrections and interval Q compensation provides an improvement percentage of 235%. This improvement percentage is higher than the improvement percentage of the other two correction methods.

Figure 5:
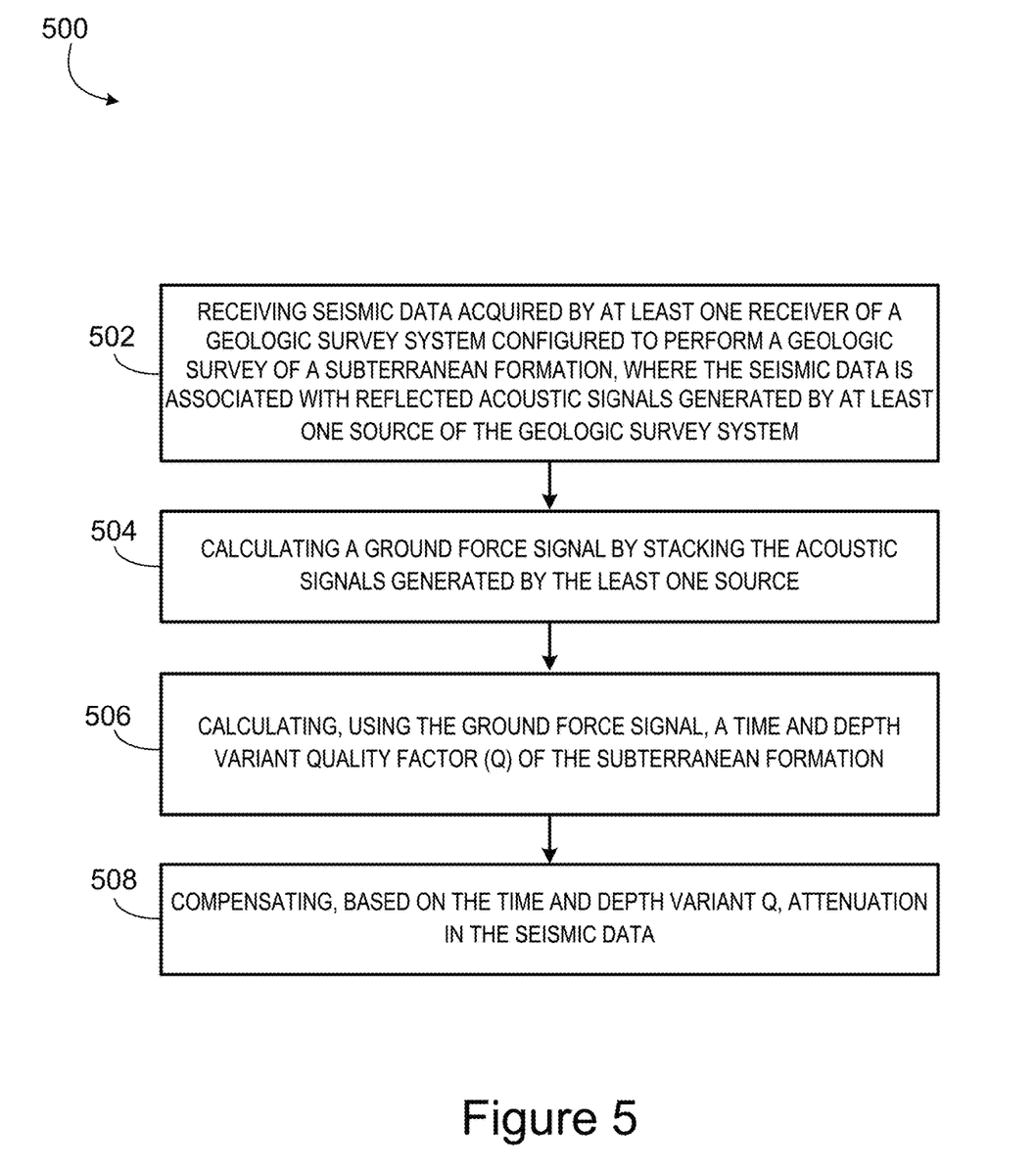
FIG. 5 illustrates a flowchart of an example method, according to some implementations of the present disclosure.

FIG. 5 is a simplified block diagram of an example method 500 for calculating a quality factor of a subterranean formation, according to some implementations. For clarity of presentation, the description that follows generally describes method 500 in the context of the other figures in this description. For example, method 500 can be performed by a computer system described in FIG. 7. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At step 502, method 500 involves receiving seismic data acquired by at least one receiver of a geologic survey system configured to perform a geologic survey of a subterranean formation, where the seismic data is associated with reflected acoustic signals generated by at least one source of the geologic survey system.

At step 504, method 500 involves calculating a ground force signal by stacking the acoustic signals generated by the least one source.

At step 506, method 500 involves calculating, using the ground force signal, a time and depth variant quality factor (Q) of the subterranean formation.

At step 508, method 500 involves compensating, based on the time and depth variant Q, attenuation in the seismic data.

Figure 6:
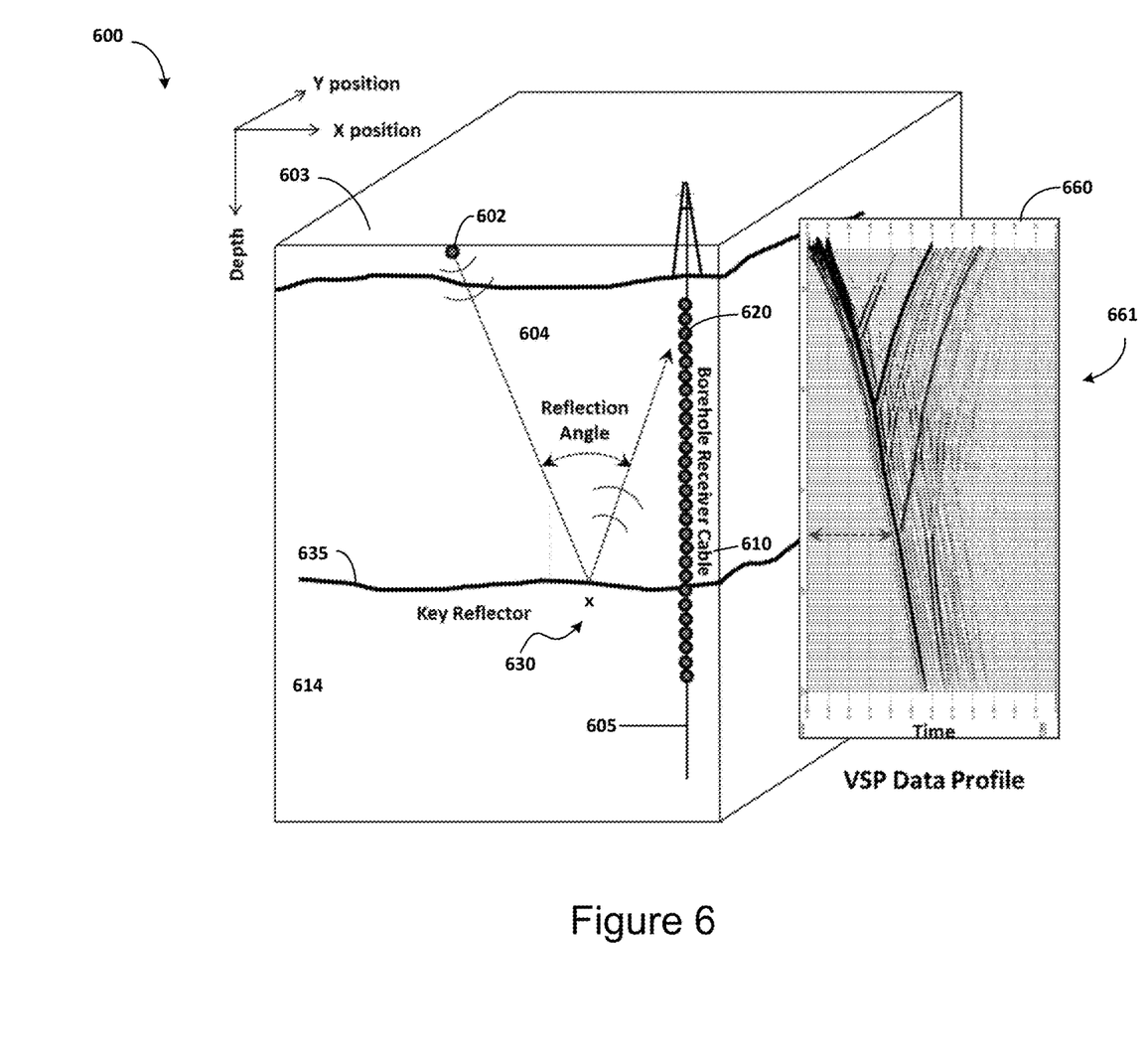
FIG. 6 illustrates a diagram showing a well survey system, according to some implementations of the present disclosure.

FIG. 6 is a diagram showing a well survey system 600, according to some implementations. In an embodiment, the well survey system 600 is used to acquire three-dimensional (3D) VSP data. In the illustrated example, the well survey system 600 is located over a subterranean formation 604. The well survey system 600 can be implemented in land, sea beds, or other subterranean regions. Furthermore, the well survey system 600 can be any type of VSP survey system. For example, the well survey system 600 may be a zero-offset vertical seismic profile system (ZVSP). Generally, in ZVSP, the source or shot is located very close to the wellbore.

The well survey system 600 includes an energy source 602. A borehole 605 is formed in the subterranean formation 604 beneath a surface 603. As shown in FIG. 6, the energy source 602 is located near the surface 603. As also shown in FIG. 6, multiple receivers 620, for example, geophones, are assembled in a wire-line cable 610 deployed in the borehole 605. The example borehole 605 shown in FIG. 6 is a vertical borehole. However, the well survey system 600 may include any combination of horizontal, vertical, slant, curved, or other borehole orientations. Furthermore, the well survey system 600 can include additional or different components than those illustrated in FIG. 6.

By firing the energy source beneath the surface 603, acoustic waves can travel through solid earth 614, be reflected by a seismic reflector (also known as a reflection point or an image point) 630 from layer boundaries 635, and recorded by borehole receivers 620. The subplot 661 of FIG. 6 illustrates example recorded VSP data 660 that shows both downgoing and upgoing energies that can be imaged in angle domain using the reflection-angle attribute. In some implementations, the VSP data 660 can be acquired at various depth levels along the borehole 605.

Compared with surface seismic data recorded based on seismic waves originated from a source and a receiver that are both located on the surface, VSP data can have less noise and higher fidelity, and can be analyzed for reservoir properties via imaging, modeling and inversion for various seismic attributes.

Figure 7:
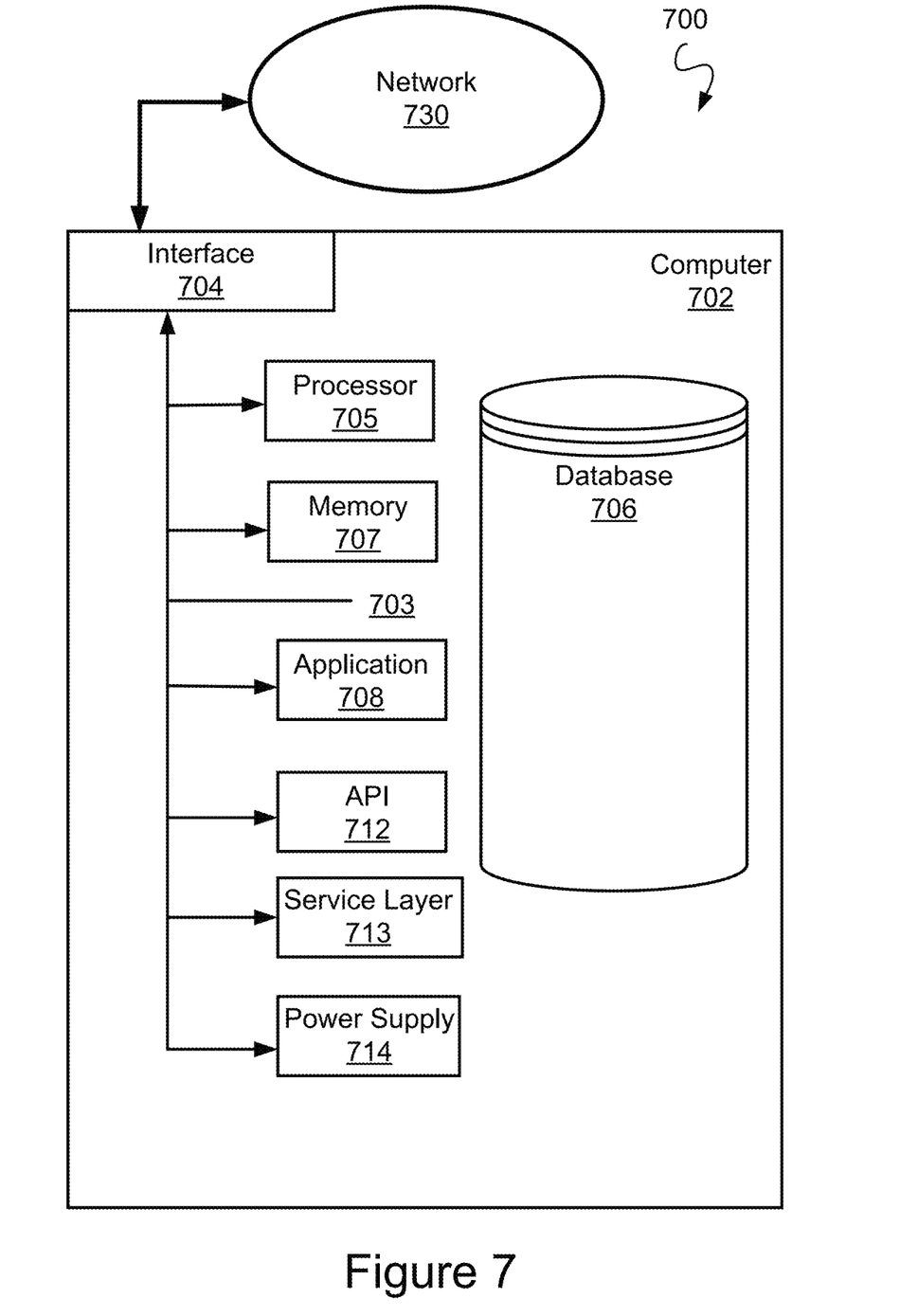
FIG. 7 illustrates a block diagram of an example computer system used to provide computational functionalities associated with described algorithms, methods, functions, processes, flows, and procedures, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:

1. A method comprising:
receiving seismic data acquired by at least one receiver of a geologic survey system configured to perform a geologic survey of a subterranean formation, wherein the seismic data is associated with reflected acoustic signals generated by a source of the geologic survey system;
calculating a ground force signal by stacking the acoustic signals generated by the source;

calculating, using the ground force signal, a time and depth variant quality factor (Q) of the subterranean formation, wherein the at least one receiver comprises a plurality of receivers, and wherein calculating, using the ground force signal, the time and depth variant quality factor (Q) of the subterranean formation comprises:
  calculating, using the ground force signal, a respective Q for a plurality of intervals in the subterranean formation, wherein the plurality of intervals are defined by a respective depth of the plurality of receivers within the subterranean formation;
compensating, based on the time and depth variant Q, attenuation in the seismic data; and
using the compensated seismic data to generate seismic images of the subterranean formation, wherein the compensated seismic data is used in looking ahead of a drilling bit that is drilling a wellbore in the subterranean formation.

2. The method of claim 1, wherein the geologic survey system is a vertical seismic profile (VSP) system, and wherein the seismic data is VSP data.

3. The method of claim 1, wherein calculating, using the ground force signal, the time and depth variant quality factor (Q) of the subterranean formation comprises:
using a spectral ratio method to calculate the time and depth variant quality factor.

4. The method of claim 1, further comprising:
generating, based on data from nearby wells, an initial Earth model.

5. The method of claim 4, further comprising:
creating, based on the seismic data, a corridor stack;
inverting the corridor stack to create an acoustic impedance profile of the subterranean formation;
using an empirical relationship to derive a density from the initial Earth model;
fitting (i) measured density from wellbore logging data and (ii) the derived density from the initial Earth model; and
using the acoustic impedance profile and the fitted density to calculate a velocity profile ahead of a drilling bit that is drilling a wellbore in the subterranean formation.

6. The method of claim 5, further comprising:
generating, using the velocity profile ahead of the drilling bit, a depth profile ahead of the drilling bit.

7. The method of claim 1, further comprising:
using a spectral ratio method to estimate a Q of the ground force signal; and
determining, based on the Q of the ground force signal, whether losses in the seismic data are due to geology of the subterranean formation.

8. The method of claim 1, further comprising:
calculating a standard deviation of the ground force signal; and
determining, based on the standard deviation of the ground force signal, whether losses in the seismic data are due to geology of the subterranean formation.

9. A device comprising:
one or more processors; and
a non-transitory computer-readable storage medium coupled to the one or more processors and storing programming instructions for execution by the one or more processors, the programming instructions instructing the one or more processors to perform operations comprising:
  receiving seismic data acquired by at least one receiver of a geologic survey system configured to perform a geologic survey of a subterranean formation, wherein the seismic data is associated with reflected acoustic signals generated by a source of the geologic survey system;
  calculating a ground force signal by stacking the acoustic signals generated by the source;
  calculating, using the ground force signal, a time and depth variant quality factor (Q) of the subterranean formation, wherein the at least one receiver comprises a plurality of receivers, and wherein calculating, using the ground force signal, the time and depth variant quality factor (Q) of the subterranean formation comprises:
    calculating, using the ground force signal, a respective Q for a plurality of intervals in the subterranean formation, wherein the plurality of intervals are defined by a respective depth of the plurality of receivers within the subterranean formation;
  compensating, based on the time and depth variant Q, attenuation in the seismic data and
  using the compensated seismic data to generate seismic images of the subterranean formation, wherein the compensated seismic data is used in looking ahead of a drilling bit that is drilling a wellbore in the subterranean formation.

10. The device of claim 9, wherein the geologic survey system is a vertical seismic profile (VSP) system, and wherein the seismic data is VSP data.

11. The device of claim 9, wherein calculating, using the ground force signal, the time and depth variant quality factor (Q) of the subterranean formation comprises:
using a spectral ratio method to calculate the time and depth variant quality factor.

12. The device of claim 9, the operations further comprising:
generating, based on data from nearby wells, an initial Earth model.

13. The device of claim 12, the operations further comprising:
creating, based on the seismic data, a corridor stack;
inverting the corridor stack to create an acoustic impedance profile of the subterranean formation;
using an empirical relationship to derive a density from the initial Earth model;
fitting (i) measured density from wellbore logging data and (ii) the derived density from the initial Earth model; and
using the acoustic impedance profile and the fitted density to calculate a velocity profile ahead of the drilling bit.

14. The device of claim 13, the operations further comprising:
generating, using the velocity profile ahead of the drilling bit, a depth profile ahead of the drilling bit.

15. A non-transitory computer-readable medium storing instructions executable by a computer system to perform operations comprising:
receiving seismic data acquired by at least one receiver of a geologic survey system configured to perform a geologic survey of a subterranean formation, wherein the seismic data is associated with reflected acoustic signals generated by a source of the geologic survey system;
calculating a ground force signal by stacking the acoustic signals generated by the source;
calculating, using the ground force signal, a time and depth variant quality factor (Q) of the subterranean formation, wherein the at least one receiver comprises a plurality of receivers, and wherein calculating, using the ground force signal, the time and depth variant quality factor (Q) of the subterranean formation comprises:

calculating, using the ground force signal, a respective Q for a plurality of intervals in the subterranean formation, wherein the plurality of intervals are defined by a respective depth of the plurality of receivers within the subterranean formation;

compensating, based on the time and depth variant Q, attenuation in the seismic data; and using the compensated seismic data to generate seismic images of the subterranean formation, wherein the compensated seismic data is used in looking ahead of a drilling bit that is drilling a wellbore in the subterranean formation.

16. The non-transitory computer-readable medium of claim 15, wherein the geologic survey system is a vertical seismic profile (VSP) system, and wherein the seismic data is VSP data.

17. The non-transitory computer-readable medium of claim 15, wherein calculating, using the ground force signal, the time and depth variant quality factor (Q) of the subterranean formation comprises:

using a spectral ratio method to calculate the time and depth variant quality factor.

* * * * *